(12) United States Patent
Gruber

(10) Patent No.: US 11,712,810 B2
(45) Date of Patent: Aug. 1, 2023

(54) GRIPPER

(71) Applicant: Multivac Sepp Haggenmüller SE & Co. KG, Wolfertschwenden (DE)

(72) Inventor: Stefan Gruber, Revetal (NO)

(73) Assignee: MULTIVAC SEPP HAGGENMÜLLER SE & CO. KG, Wolfertschwenden (DE)

( * ) Notice: Subject to any disclaimer, the term of this patent is extended or adjusted under 35 U.S.C. 154(b) by 648 days.

(21) Appl. No.: 16/610,424

(22) PCT Filed: May 3, 2017

(86) PCT No.: PCT/EP2017/060491
§ 371 (c)(1),
(2) Date: Mar. 2, 2021

(87) PCT Pub. No.: WO2018/202286
PCT Pub. Date: Nov. 8, 2018

(65) Prior Publication Data
US 2021/0268665 A1 Sep. 2, 2021

(51) Int. Cl.
*B25J 15/00* (2006.01)
*B25J 9/00* (2006.01)
*B25J 9/16* (2006.01)
*B25J 15/02* (2006.01)

(52) U.S. Cl.
CPC ......... *B25J 15/0014* (2013.01); *B25J 9/0093* (2013.01); *B25J 9/1687* (2013.01); *B25J 15/0253* (2013.01)

(58) Field of Classification Search
None
See application file for complete search history.

(56) References Cited

U.S. PATENT DOCUMENTS

| 7,904,198 | B2 * | 3/2011 | Hawes | B25J 15/0253 |
| | | | | 414/735 |
| 9,302,395 | B2 * | 4/2016 | Ando | B25J 11/0095 |
| 2012/0086226 | A1 * | 4/2012 | Weber | B25J 15/0014 |
| | | | | 294/81.54 |
| 2021/0407837 | A1 * | 12/2021 | Hudgens | B25J 15/0014 |

FOREIGN PATENT DOCUMENTS

| DE | 69306083 T2 | 4/1997 |
| DE | 102015113220 A1 | 2/2017 |
| EP | 2439026 A1 | 4/2012 |
| JP | 2002103268 A | 4/2002 |

OTHER PUBLICATIONS

International Search Report and Written Opinion for PCT/EP2017/060491 dated Feb. 5, 2018.

* cited by examiner

Primary Examiner — Michael S Lowe
(74) Attorney, Agent, or Firm — Brooks Kushman P.C.

(57) ABSTRACT

A gripper that comprises a first receiving plate for receiving a first product portion and a second receiving plate for receiving a second product portion, wherein the receiving plates are movable relative to one another. The gripper further including a first movable stop which is movable relative to the first receiving plate, and a second movable stop which is movable relative to the second receiving plate. The gripper is distinguished by the fact that the first stop and second stop are movable relative to one another so as to move the product portions towards one another when the gripper is closed such that the product portions then may be positioned to overlap one another.

16 Claims, 3 Drawing Sheets

GRIPPER

CROSS-REFERENCE TO RELATED APPLICATIONS

This application claims priority to PCT Patent Application No. PCT/EP2017/060491 filed on May 3, 2017 to Stefan Gruber, currently pending, the entire disclosure of which is incorporated herein by reference.

FIELD OF THE INVENTION

The invention relates to a gripper for producing overlapping products in a container and a method for using such a gripper.

BACKGROUND OF THE INVENTION

A receiving gripper for receiving food is disclosed in EP 1685045 B1. The receiving gripper comprises two receiving sickles in the form of plates movable relative to one another. The gripper is arranged on a delta robot and is provided for receiving products from a conveyor belt and then depositing or dropping the products into a container.

A receiving gripper which comprises two receiving plates movable relative to one another is also known from DE 102009016333 A1.

To form overlapping products or product portions in a package, the gripper removes the product portion from a feed belt and places the products that are intended for a combined portion sequentially and offset into a container to produce an overlap of the portions or products, respectively.

Alternatively, it is known that products overlapping already on the feed belt are received as a portion by the gripper and then placed together into the container. The overlap of two products or portions in the region upstream of the feed belt is complex and requires increased space.

SUMMARY OF THE INVENTION

The object of the present invention is to provide an alternative gripper for producing overlapping products in a container.

This object is satisfied by such a gripper as well as by a method for using such a gripper.

The gripper according to the invention comprises a first receiving plate for receiving (or picking up) a first product portion and a second receiving plate for receiving (or picking up) a second product portion, where the receiving plates (viz. pick-up plates) are movable relative to one another. Furthermore, the gripper comprises a first movable stop associated with the first receiving plate and movable relative thereto, and a second movable stop associated with the second receiving plate and movable relative thereto. The gripper according to the invention is distinguished by the fact that the first and the second stop are movable relative to one another so as to move the product portions toward one another when the gripper is closed such that the product portions then overlap one another. This makes it possible to perform the overlapping of the product portions only by use of the gripper, and this process can take place during the motion of the gripper from the feed belt to the container, so that the machine or line performance of a packaging system is increased or a picker can be omitted in a picker line with multiple pickers due to the Increase of individual performance of all pickers of the picker line and costs can thus be reduced. The term picker not only includes delta robots but also two-axis robots on which such a gripper is arranged.

A first receiving plane of the first receiving plate is preferably, orthogonally to the direction of motion of the receiving plates, higher than a second receiving plane of the second receiving plate in order to move the first product portion in a simple manner over the second product portion and to thus produce an overlap.

In a particularly advantageous embodiment, the first receiving plate has a greater extension in height than the second receiving plate in order to be able to displace the first product portion in a simple manner over the second product portion and to thus produce an overlap.

The gripper preferably comprises a first product hold-down device and/or a second product hold-down device in order to securely hold the product portions on the receiving plate at high accelerations. For this purpose, the product hold-down device is preferably movable orthogonally relative to the receiving plane.

The first stop and the second stop preferably each have a drive to move both the first product portion as well as the second product portion relative to each other at the same time or successively and to thus be able to overlay them. The respective drive is preferably a servomotor or a stepper motor or a pneumatic drive. This entails the advantages that, firstly, the overlapped portion can be, for example, centrally aligned relative to the receiving plates, secondly, the product portion can be pushed together to an optionally adjustable variably definable total width, which is stored in the controller and in direct reference to the dimensions the container. The width can then be produced smaller by a desired value than the width of the container relative to the advance direction for reliably depositing or inserting the overlapped product portion.

A robot unit with a controller is preferably provided in which a dimension of the overlap can be stored in order to move the stops accordingly, so that the dimension of the overlap intended for the container can be produced by the gripper itself.

A method according to the invention for operating a gripper is characterized in that the first product portion is received by the first receiving plate and the second product portion by the second receiving plate and the gripper moves both receiving plates to a closed position. Moving the receiving plates to the closed position takes place either when or after the second product portion is or has been received, e.g. the receiving motion could also be identical to the motion of the gripper to its closed position. The second product portion is pushed by the second stop in the direction of the first receiving plate before the first product portion is pushed by the first stop over the second product portion in the direction of the second receiving plate in order to overlap the two product portions when the gripper is closed. Thereafter, the overlapped overall portion consisting of the two product portions is placed into a container or onto a conveyor belt. Production time can be saved in this manner because the function "overlapping two product portions" is effectuated by the gripper itself and during the transfer motion from the feed belt to the container. At the same time, feed belts for producing overlapping product portions can be omitted. This leads to a smaller demand for space, a smaller so-called footprint, for the packaging system.

After receipt of the respective product portion until the respective product portion is pushed by the stop or stops, a first and/or a second product hold-down device are preferably in a lower holding position in order to securely hold the product portions on the receiving plates at high accelerations of the gripper.

In a particularly advantageous embodiment, the first product portion lies on the first receiving plate above and laterally offset from the second product portion which is located on the second receiving plate. Pushing the first product portion onto or over the second product portion can then be done in the simplest manner.

The dimension of the overlap is preferably stored in the controller of the robot unit and the controller moves the stops accordingly.

The invention is not restricted to receiving only two product portions. The first product portion can consist, for example, of several rows of shingled individual products such as sausage, meat or cheese slices. Other aspects and advantages of the present invention will be apparent from the following detailed description of the preferred embodiments and the accompanying drawing figures.

DESCRIPTION OF THE SEVERAL VIEWS OF THE DRAWINGS

In the following, an advantageous embodiment of the invention is further illustrated using a drawing.

Same components are designated with the same reference numerals throughout the figures.

DETAILED DESCRIPTION OF THE INVENTION

Figure 1:
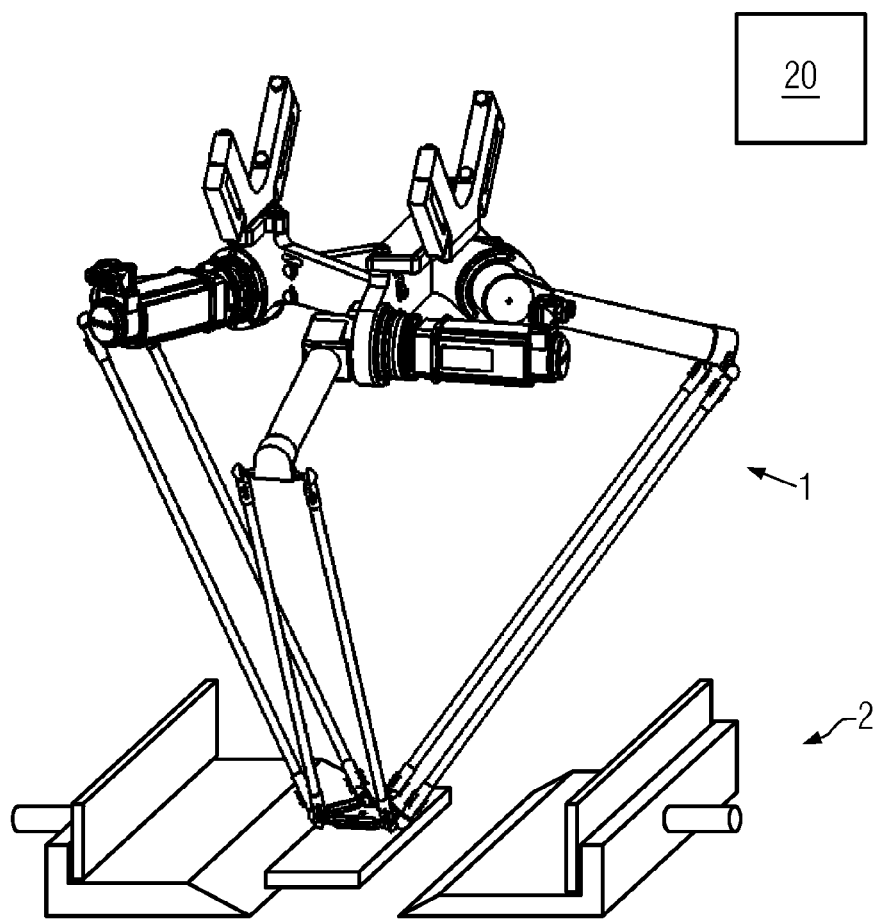
FIG. 1 shows a picker with a gripper according to the invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows a picker 1 as a robot unit in the form of a delta robot with a gripper 2 according to the invention. A controller 20 is provided for picker 1 and gripper 2 in which, for example, settings for gripper 2 can be stored in programs.

Figure 2:
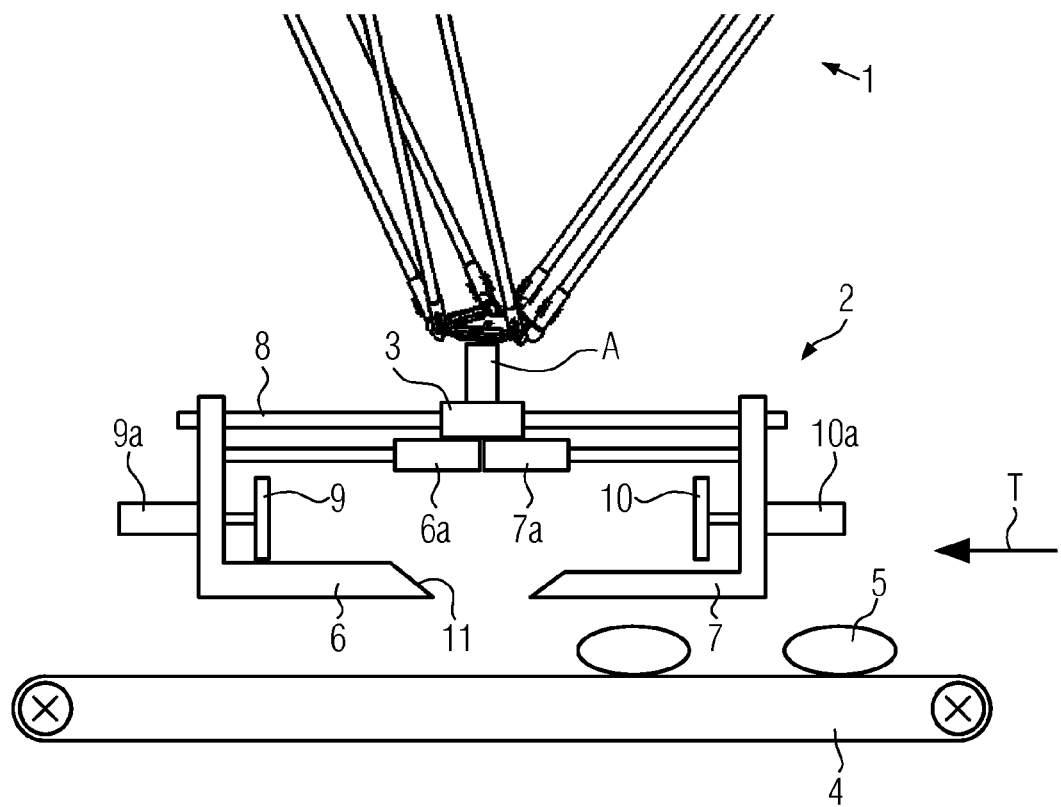
FIG. 2 shows a view of the gripper in the transport direction of products to be received.

FIG. 2 shows a view of gripper 2 which is arranged rotatable about a vertical axis of rotation on picker 1 by way of a connecting element 3, where a feed belt 4 supplies products in a transport direction T 5 to the picking area of picker 1. Gripper 2 comprises a first receiving plate 6 shown on the left-hand side in FIG. 2 and an oppositely disposed second receiving plate 7 on the right-hand side. Both receiving plates 6, 7 are movable separately and relative to one another by way of a horizontal guide 8 and a respective adjustment drive 6a, 7a to receive and deposit products 5.

Gripper 2 further comprises a first movable stop 9 which is associated with the first receiving plate 6 to move products 5 or product portions relative to receiving plate 6. Analogously, gripper 2 comprises a second movable stop 10 for the second receiving plate 7. In the embodiment shown, a respective preferably motorized adjustment drive 9a, 10a is provided on respective receiving plates 6, 7 for moving the stops 9, 10. Adjustment drives 9a, 10a could also be arranged on another part of gripper 2 for moving products 5 on receiving plates 6, 7 or to act as a stop in the product reception.

Product reception or pick-up not shown in detail and known from prior art takes place such that gripper 2 approaches feed belt 4 as closely as possible with the underside of receiving plates 6, 7 and then performs a motion of receiving plate 6, 7 in the direction of product 5 in order to push itself under product 5 using a slanted edge 11 at the front side of receiving plate 6, 7, so that the product comes to rest in a desired position on receiving plate 6, 7.

Figure 3:
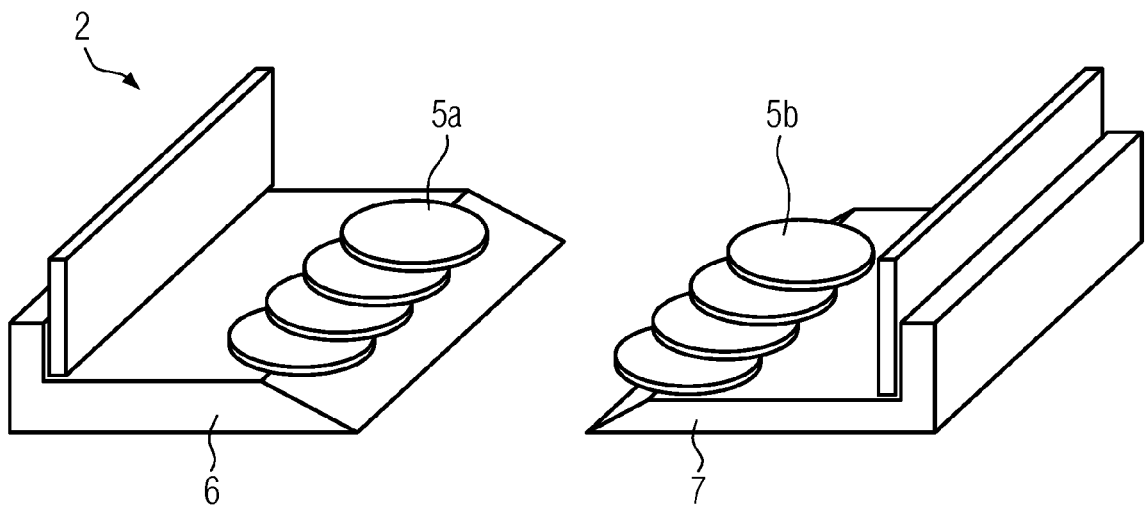
FIG. 3 shows the gripper in an open position with product portions received on both sides.

FIG. 3 shows gripper 2 with product portions 5 each received on both sides in an open position after first receiving plate 6 has received first product portion 5a and second receiving plate 7 has received second product portion 5b.

Figure 4:
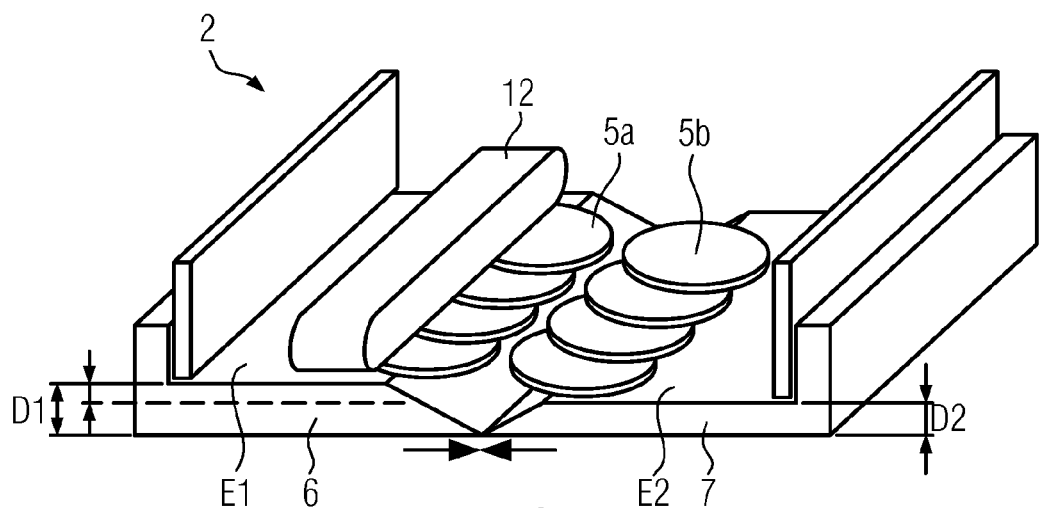
FIG. 4 shows the gripper in a closed position and FIG. 5 shows the closed gripper after an overlapping operation before the overall portion is deposited.

FIG. 4 shows gripper 2 in a closed position in which the two receiving plates 6, 7 have been moved toward each other. In this illustration, it can be clearly seen that first receiving plate 6 has a first receiving plane E1 which orthogonally to the direction of motion, i.e. in the vertical direction, is higher than a second receiving plane E2 of the second receiving plate.

In this embodiment, first receiving plate 6 has a greater thickness D1 than second receiving plate D2. Instead of having a greater thickness D1 of first receiving plate 6, both receiving plates 6, 7 could be formed to be identical in their thickness D1, D2, but where one of the two receiving plates 6, 7 comprises a vertical adjustment device, not shown.

FIG. 4 shows a variant of gripper 2 showing a product hold-down device 12, for example for first receiving plate 6 which presses first product portion 5a onto first receiving plane E1 in order to prevent a change in the position of first product portion 5a on first receiving plate 6 during a rapid gripper motion. Additionally or alternatively, a corresponding product hold-down device 12 can also be provided for second receiving plate 7.

Figure 5:
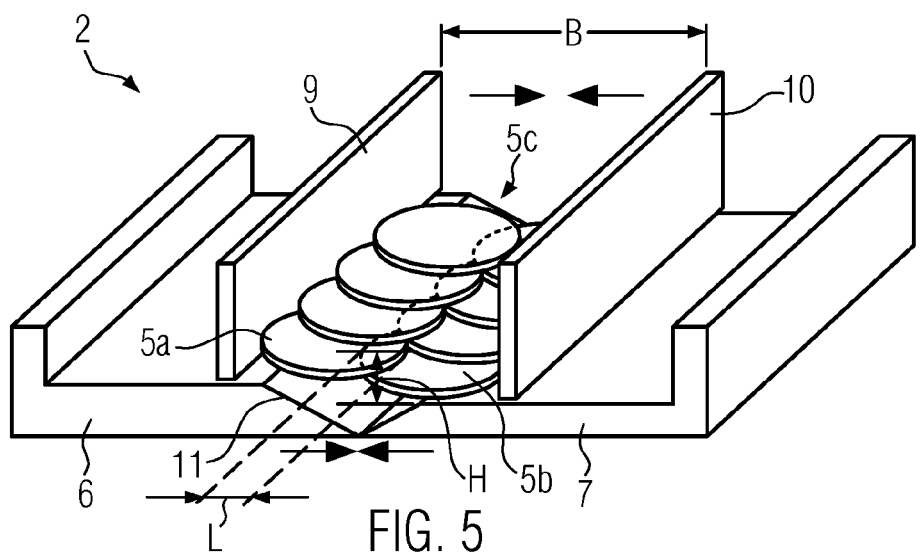

FIG. 5 shows closed gripper 2 after an overlap operation before the overall portion 5c consisting of product portions 5a and 5b is deposited. The overlap process begins with closing the two receiving plates 6, 7 to each other. Subsequently, second stopper 10 pushes second product portion 5b in the direction of first receiving plate 6 such that second product portion 5b comes to lie on slanted edge 11. Thickness D1 of receiving plate 6, also referred to as the extension in height, is preferably greater by at least one product height H of second product portion 5b than thickness D2 of second receiving plate 7. This ensures that first product portion 5a can be pushed in the subsequent motion of first stop 9 over second product portion 5b in the direction of second receiving plate 7. Dimension L for the overlap and total width B of overlapping overall portion 5c can be produced or set by way of the position of the two stops 9, 10 relative to one another. Dimension L for the overlap or overlapping can be stored in controller 20. For example, overall portions with a different overall width B can thus be produced, even if the same product portions 5a, 5b are repositioned.

Producing the overlap can take place during the transfer motion of gripper 2 from feed belt 4 to the packaging containers, not shown, in order to save process time. When deposited in a packaging container, overall portion 5c is released by the two receiving plates 6, 7 moving apart and can drop into the packaging container. Stops 9, 10 maintain their position relative to overall portion 5c in order to very accurately position overall portion 5c in position in relation to the packaging container.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The invention claimed is:

1. A gripper comprising:
   a first receiving plate for receiving a first product portion and a second receiving plate for receiving a second product portion, wherein said first and said second receiving plates are disposed for movement relative to one another, said first receiving plate defines a first receiving plane, said second receiving plate defines a second receiving plane, and said first receiving plane is higher than said second receiving plane in a direction orthogonal to a direction of motion of said first and second receiving plates; and
   a first movable stop which is movable relative to said first receiving plate, and a second movable stop which is movable relative to said second receiving plate, wherein said first stop and said second stop are disposed for movement relative to one another so as to move said first and said second product portions toward one another when said gripper is in a closed position in a manner capable to overlap said first and said second product portions.

2. The gripper according to claim 1, wherein said first receiving plate has a greater extension in height than said second receiving plate.

3. The gripper according to claim 2, wherein the extension in height of said first receiving plate is greater by at least 5 mm than the extension in height of said second receiving plate.

4. The gripper according to claim 1, wherein said gripper has at least one of a first product hold-down device and a second product hold-down device.

5. The gripper according to claim 4, wherein said at least one of the first product hold-down device and the second product hold-down device is disposed for movement in a direction orthogonal to said receiving plane.

6. The gripper according to claim 1, wherein said first stop and said second stop each comprise a drive.

7. The gripper according to claim 6, wherein said respective drive is one of a servo motor, a stepping motor, or a pneumatic drive.

8. A robot unit comprising:
   a gripper according to claim 1; and
   a controller capable of storing a dimension for the overlap of said first and said second product portions.

9. The gripper according to claim 1, wherein, when said gripper is in said closed position, said second stop is movable toward said first receiving plate to push said second product portion toward said first receiving plate, and, after movement of said second stop, said first stop is movable toward said second receiving plate to push said first product portion on top of said second product portion to overlap said first and second product portions.

10. A method for operating a gripper, the method comprising the steps of:
    receiving a first product portion on a first receiving plate;
    receiving a second product portion on a second receiving plate;
    moving said two receiving plates to a closed position;
    pushing said second product portion toward said first receiving plate using a second stop;
    pushing, using a first stop, said first product portion on top of said second product portion toward said second receiving plate after the pushing said second product portion step in order to overlap said first and said second product portions when said gripper is closed; and
    depositing both said first and said second product portions in an overlapped position in a container or onto a conveyor belt.

11. The method according to claim 10, further comprising at least one of the steps of positioning a first product hold-down device in a lower holding position on said first receiving plate after the receiving the first product portion step and of positioning a second product hold-down device in a lower holding position on said second receiving plate after the receiving the second product portion step and until the respective product portion is pushed by at least one of said first or said second stop.

12. The method according to claim 10, wherein said first product portion lies on said first receiving plate above and laterally offset from said second product portion located on said second receiving plate.

13. The method according to claim 10, further comprising the step of storing a dimension for the overlap of said first product portion and said second product portion in a controller of a robot unit comprising said gripper; and moving said at least one of said first or said second stop using said controller such that said first product portion and said second product portion overlap by said dimension.

14. A gripper comprising:
   a first receiving plate for receiving a first product portion and a second receiving plate for receiving a second product portion, wherein said first and said second receiving plates are disposed for movement relative to one another, and said first receiving plate has an extension in height that is greater than an extension in height of said second receiving plate; and
   a first movable stop which is movable relative to said first receiving plate, and a second movable stop which is movable relative to said second receiving plate wherein said first stop and said second stop are disposed for movement relative to one another so as to move said first and said second product portions toward one another when said gripper is in a closed position in a manner capable to overlap said first and said second product portions.

15. The gripper according to claim 14, wherein the extension in height of said first receiving plate is greater by at least 5 mm than the extension in height of said second receiving plate.

16. The gripper according to claim 14, wherein, when said gripper is in said closed position, said second stop is movable toward said first receiving plate to push said second product portion toward said first receiving plate, and, after movement of said second stop, said first stop is movable toward said second receiving plate to push said first product portion toward said second receiving plate to overlap said first and second product portions.

* * * * *